United States Patent
Kim

(10) Patent No.: US 8,966,146 B2
(45) Date of Patent: Feb. 24, 2015

(54) DATA PROCESSING METHOD AND DATA PROCESSING UNIT USING THE SAME

(71) Applicant: Ju-young Kim, Seoul (KR)

(72) Inventor: Ju-young Kim, Seoul (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 27 days.

(21) Appl. No.: 13/799,672

(22) Filed: Mar. 13, 2013

(65) Prior Publication Data

US 2013/0275634 A1 Oct. 17, 2013

(30) Foreign Application Priority Data

Apr. 16, 2012 (KR) .................. 10-2012-0039276

(51) Int. Cl.
| | |
|---|---|
| *G06F 3/00* | (2006.01) |
| *G06F 13/00* | (2006.01) |
| *G06F 13/20* | (2006.01) |
| *G06F 13/38* | (2006.01) |
| G06F 9/445 | (2006.01) |
| G06F 9/54 | (2006.01) |
| G06F 13/28 | (2006.01) |

(52) U.S. Cl.
CPC .............. *G06F 13/20* (2013.01); *G06F 13/385* (2013.01); *G06F 8/65* (2013.01); *G06F 9/546* (2013.01); *G06F 13/28* (2013.01)
USPC ................... 710/71; 710/16; 710/52

(58) Field of Classification Search
CPC .......... G06F 13/385; G06F 8/65; G06F 13/28
See application file for complete search history.

(56) References Cited

U.S. PATENT DOCUMENTS

| | | | |
|---|---|---|---|
| 2007/0253503 A1* | 11/2007 | Kim et al. ................... | 375/265 |
| 2010/0061643 A1 | 3/2010 | Fukuhara et al. | |
| 2010/0136931 A1 | 6/2010 | Kwak et al. | |
| 2011/0149035 A1 | 6/2011 | Tsukagoshi | |

FOREIGN PATENT DOCUMENTS

| | | |
|---|---|---|
| JP | 2001-345964 A | 12/2001 |
| JP | 2005-071278 A | 3/2005 |
| JP | 2007-088615 A | 4/2007 |
| JP | 2010-114762 A | 5/2010 |
| JP | 2010-206775 A | 9/2010 |
| JP | 2010-252167 A | 11/2010 |
| KR | 10-2003-0016125 A | 2/2003 |
| KR | 10-0660992 B1 | 12/2006 |

* cited by examiner

*Primary Examiner* — Zachary K Huson
(74) *Attorney, Agent, or Firm* — Harness, Dickey & Pierce, P.L.C.

(57) ABSTRACT

A data processing unit includes a main controller configured to receive data requirement information from a host and to generate processing information based on the data requirement information; a pre-processing unit configured to pre-process n types of data output from the main controller according to the processing information and to generate n types of pre-processed data where n is an integer equal to or greater than 2; and a pre-processed data storing unit configured to store the n types of pre-processed data and to output the n types of pre-processed data in an output order determined based on the processing information, wherein the processing information includes information about at least one of type, format, order, size and transmission mode of the n types of pre-processed data.

19 Claims, 11 Drawing Sheets

DATA PROCESSING METHOD AND DATA PROCESSING UNIT USING THE SAME

CROSS-REFERENCE TO RELATED APPLICATIONS

This application claims priority under 35 U.S.C. §119(a) from Korean Patent Application No. 10-2012-0039276 filed on Apr. 16, 2012, the disclosure of which is hereby incorporated by reference in its entirety.

BACKGROUND

Example embodiments of the inventive concepts relate to a data processing method and a data processing unit using the same, and more particularly, to a method of processing data referring to data request information from a host and a data processing unit using the method.

In general, data processing is an operation of converting original data into a form that a user can use before providing the data to the user, for example, an operation of converting analog data into digital data or a key input from a keyboard into a hardware code, converting the hardware code into an American Standard Code for Information Interchange (ASCII) code, converting the ASCII code into a font, and outputting the font to a display. It may be preferable to carry out such data processing without errors as fast as possible in order to quickly provide users with information. In addition, an effort to reduce the amount of computation may be preferable in a mobile environment, such as a smart phone or a tablet personal computer (PC), in order to reduce power consumption. Recently, research and development on efficient data processing and transmission has been carried out in relation with the spread of smart devices and the demand on faster data environments.

SUMMARY

According to an embodiment of the inventive concepts, there is provided data processing unit including a main controller configured to receive data requirement information from a host and to generate processing information based on the data requirement information, a pre-processing unit configured to pre-process "n" types of data output from the main controller according to the processing information and to generate "n" types of pre-processed data where "n" is an integer equal to or greater than 2, and a pre-processed data storing unit configured to store the "n" types of pre-processed data and to output the "n" types of pre-processed data in an output order determined based on the processing information. The processing information may include information about the type, format, order, size and transmission mode of the "n" types of pre-processed data.

According to an embodiment of the inventive concepts, the main controller may receive data from a data generator and generate the "n" types of data. The "n" types of data may include pointer data corresponding to information about an absolute or relative memory address of each of remaining ones of the n types of data.

According to an embodiment of the inventive concepts, there is provided a data processing method including receiving, at a main controller, data requirement information from a host; generating processing information based on the data requirement information; pre-processing, at a pre-processing unit, n types of data output from the main controller according to the processing information and generating n types of pre-processed data where n is an integer of at least 2; storing, at a pre-processed data storing unit, the n types of pre-processed data; and outputting the n types of pre-processed data in an output order determined based on the processing information, wherein the processing information includes information about at least one of type, format, order, size and transmission mode of the n types of pre-processed data.

According to an example embodiment of the inventive concepts, the receiving receives data from a data generator and the generating generates the "n" types of data. The "n" types of data may include pointer data corresponding to information about an absolute or relative memory address of each of remaining ones of the n types of data.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
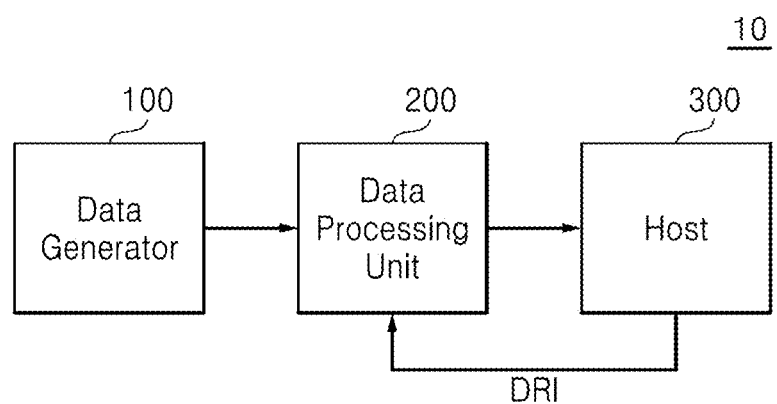
FIG. 1 is a schematic block diagram of a data processing system according to an embodiment of the inventive concepts.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the tends "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic block diagram of a data processing system 10 according to an embodiment of the inventive concepts. The data processing system 10 includes a data generator 100, a data processing unit 200, and a host 300. The data processing system 10 may be implemented as a personal computer (PC), a memory card, a smart card, a mobile phone, a smart phone, a personal digital assistant (PDA), a portable multimedia player (PMP), a digital camera, or a solid state drive.

The data generator 100 may generate data needed by a user in an analog format or in a digital format. The data generator 100 may be any device that generates at least one type of data, including, for example, an image sensor capturing an object and generating a two-dimensional (2D) image, a three-dimensional image sensor generating depth information together with the 2D image, a microphone or MP3 player generating audio data, or a CD or DVD player generating audio and video data.

For instance, the image sensor may generate RGB data and/or capture data corresponding to the 2D image. One or more of the RGB data, capture data, depth data, and audio data may be classified into different types. The data generator 100 may include a plurality of elements generating data. Data generated by the data generator 100 may be transmitted to the data processing unit 200.

The data processing unit 200 may process the data from the data generator 100 into a form required by the host 300 before transmitting the data to the host 300. For instance, the data processing unit 200 may perform digitization of analog data, changing the order of at least two different types of data, transformation of data and/or addition of extra information to data required by the host 300. The data generator 100 and the data processing unit 200 may be integrated into a single chip or separately implemented in individual chips, respectively. The data processing unit 200 may receive data requirement information DRI from the host 300, generate information about the size, the order and/or the address of data, reconstruct data based on the data requirement information DRI, and transmit the reconstructed data to the host 300. The operations of the data processing unit 200 will be described in detail with reference to FIG. 2 later.

The host 300 may be any device that receives data from the data processing unit 200 and stores or uses the data in a specified form. The host 300 may operate in response to a command input by a user through an input device. For instance, the host 300 may be any device that receives data including, for example, an application processor, a central processing unit (CPU), a display, a speaker, or a sound system, which can execute a user's command. The host 300 may support serial/parallel communication interface and synchronous/asynchronous communication interface, thereby communicating data with the data processing unit 200. The host 300 may also communicate data with the data processing unit 200 via a wireless connection.

The host 300 may generate and transmit the data requirement information DRI to the data processing unit 200 in order to quickly and efficiently process and provide data for a user. The data requirement information DRI may include various kinds of information required by the host 300 including, for example, the type, format, size, timing, address and order of data and a data transmission mode (e.g., a serial or parallel mode or a synchronous or asynchronous mode). When the data requirement information DRI is sent by the host 300 to the data processing unit 200, the data processing unit 200 may reconstruct the data according to the data requirement information DRI and transmit the reconstructed data to the host 300.

Figure 2:
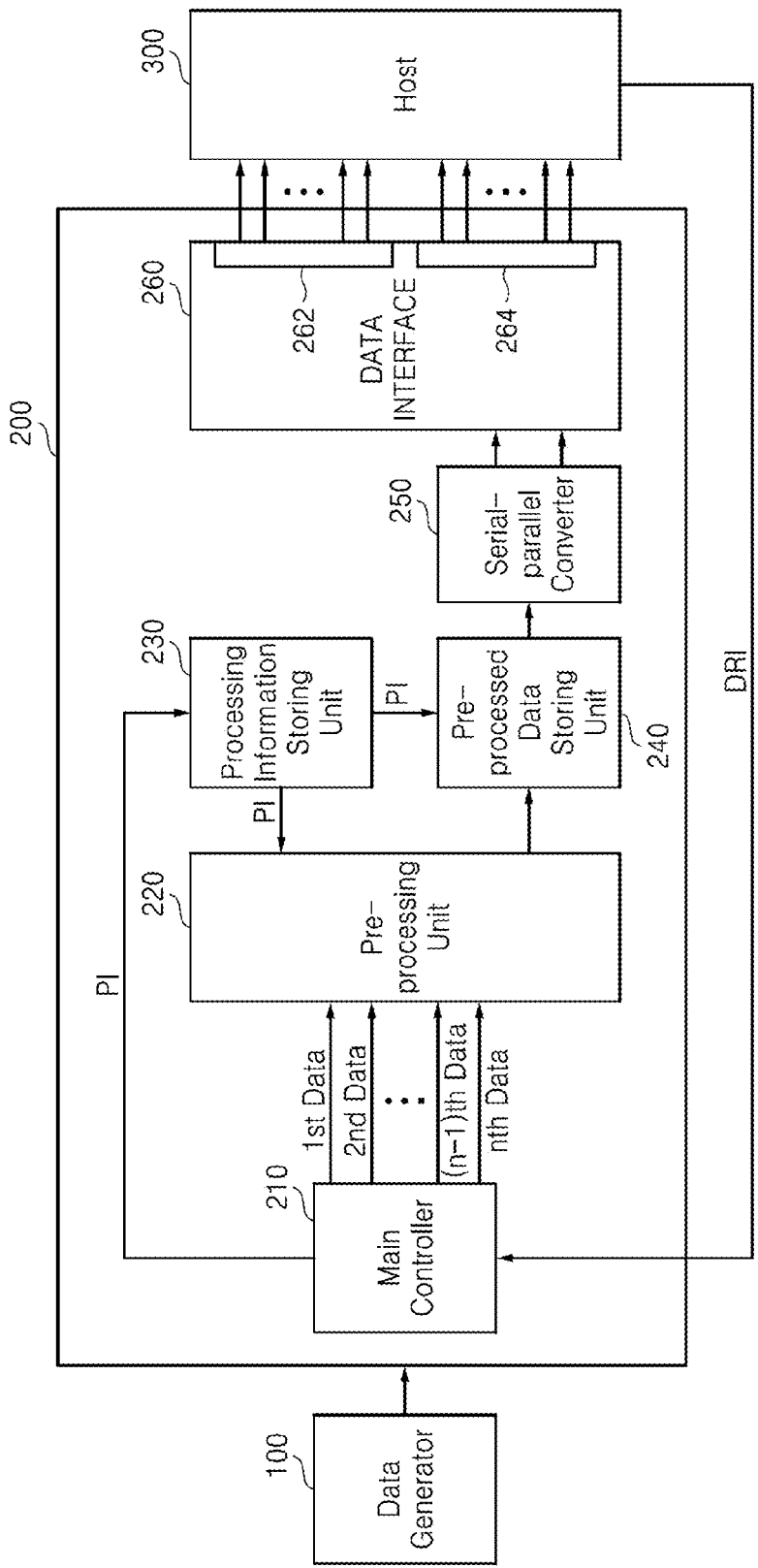
FIG. 2 is a detailed block diagram of a data processing unit included in the data processing system illustrated in FIG. 1 according to an embodiment of the inventive concepts.

FIG. 2 is a detailed block diagram of the data processing unit 200 included in the data processing system 10 illustrated in FIG. 1 according to an embodiment of the inventive concepts. Referring to FIG. 2, the data processing unit 200 includes a main controller 210, a pre-processing unit 220, a processing information storing unit 230, a pre-processed data storing unit 240, a serial-parallel converter 250, and a data interface 260.

The main controller 210 may control the overall operation of the data processing unit 200. The main controller 210 may process data generated by the data generator 100 before transmitting the data to the pre-processing unit 220. For instance, the main controller 210 may perform digitization of analog data, changing of the bit rate of audio data, generation of YCbCr data from RGB data, classification of different types of data, and/or adjustment of the contrast, brightness and hue of image data.

The main controller 210 may receive the data requirement information DRI from the host 300, generate processing information PI according to the data requirement information DRI or its judgment, and transmit the processing information PI to the processing information storing unit 230. The processing information PI may include information including, for example, the type, format, size, timing, address, order and data transmission mode (e.g., serial or parallel mode or synchronous or asynchronous mode) of packet data.

The main controller 210 may receive data from the data generator 100 and output "n" types of data in a digital form. Here, the "n" types of data may include video data, audio data, capture data, embedded data, and pointer data. The main controller 210 may group the "n" types of data by types before transmitting them to the pre-processing unit 220.

The embedded data may be generated by the main controller 210 and may include information, including, for example, an auto exposure (AE) value of an image sensor, the total number of bytes of compressed data, and the size of a packet, which is generated based on the data requirement information DRI transmitted from the host 300 or the judgment/analysis of the main controller 210. The pointer data may be generated by the main controller 210 may be information about the absolute or relative memory address of data based on the data requirement information DRI including the information about the type, size and order of the data, which are required by the host 300.

The pre-processing unit 220 may receive the "n" types of data from the main controller 210, perform pre-processing on the "n" types of data, and transmit "n" types of pre-processed data to the pre-processed data storing unit 240. The pre-processing unit 220 may include a plurality of registers (not shown) that can store the "n" types of data.

The pre-processing unit 220 may receive the processing information PI from the processing information storing unit 230, determine the size and the format of each of the "n" types of data, and perform pre-processing on each type of data. The pre-processing may be a process of changing the size and the format of each of the "n" types of data or adding size information, type information, and/or a cyclic redundancy check (CRC) code to each type of data. The pre-processing unit 220 may add dummy data depending on the serial or parallel mode or add a start bit and a stop bit depending on the synchronous or asynchronous mode referring to the processing information PI. When receiving the processing information PI indicating that the host 300 can receive only data in a predetermined format, the pre-processing unit 220 may convert the format of data into the predetermined format that can be recognized by the host 300.

For instance, when image data among the "n" types of data has a size of 500 and the size required by the processing information PI is 400, the pre-processing unit 220 may compress the image data to change the size of 500 into the size of 400. When the processing information PI requests type information to be added to the image data, the pre-processing unit 220 may add data type information to the image data. At this time, the size of the image data may be changed, and therefore, the pre-processing unit 220 may revise pointer data according to the change.

After completing the pre-processing on the "n" types of data, the pre-processing unit 220 may transmit the processed data in units of lines or packets to the pre-processed data storing unit 240. The terms "line" means a unit in which data can be transmitted at a time up to maximum in the synchronous or asynchronous mode. The term "packet" means a type of data among the "n" types of data.

The processing information storing unit 230 may receive the processing information PI from the main controller 210 and transmit the processing information PI to the pre-processing unit 220 and the pre-processed data storing unit 240. The processing information storing unit 230 may be implemented by a non-volatile memory that can retain data regardless of power supply and may use physical fuse-cutting using a laser or electrical programming to store data. For instance, the processing information storing unit 230 may be electrically erasable programmable read-only memory (EEPROM), flash memory, magnetic random access memory (MRAM), conductive bridging RAM (CBRAM), ferroelectric RAM (FeRAM), phase-change RAM (PRAM), or resistive RAM (RRAM or ReRAM).

The processing information storing unit 230 may store the processing information PI changeable over time according to the control of the main controller 210 and transmit the processing information PI to the pre-processing unit 220 and the pre-processed data storing unit 240 when necessary. Alternatively, the processing information storing unit 230 may be omitted and the main controller 210 may transmit the processing information PI directly to the pre-processing unit 220 and the pre-processed data storing unit 240.

The pre-processed data storing unit 240 may receive the pre-processed data from the pre-processing unit 220 and store the data in memory blocks. In detail, the pre-processed data storing unit 240 may be divided into "n" blocks and may store "n" types of pre-processed data transmitted in units of lines or packets of the "n" blocks by types. The pre-processed data storing unit 240 may be implemented by a non-volatile memory that can retain data regardless of power supply and may use physical fuse-cutting using a laser or electrical programming to store data. For instance, the pre-processed data storing unit 240 may be EEPROM, flash memory, MRAM, CBRAM, FeRAM, PRAM, or RRAM (or ReRAM). Alternatively, the pre-processed data storing unit 240 may be implemented by a volatile memory, including, for example, dynamic RAM (DRAM) or static RAM (SRAM), which can retain data only while power is supplied.

The "n" types of pre-processed data may be sequentially and correspondingly stored in the memory blocks. The memory blocks may be reset at a predetermined period according to the control of the main controller 210. The predetermined period may vary with the size of the memory blocks. The pre-processed data storing unit 240 may receive the processing information PI from the processing information storing unit 230 and output the "n" types of pre-processed data in units of packets in output order determined by information about the order of data required by the host 300 in the processing information PI.

The serial-parallel converter 250 may receive the "n" types of pre-processed data in units of packets and selectively convert serial data into parallel data according to the control of the main controller 210. In other words, some data corresponding to serial transmission according to data transmission mode information included in the processing information PI among the "n" types of data may be transmitted to the data interface 260 without being converted into parallel data. The remaining data corresponding to parallel transmission according to the data transmission mode information included in the processing information PI among the "n" types of data may be converted into parallel data by the serial-parallel converter 250 before being transmitted to the data interface 260.

The operation of the serial-parallel converter 250 may be carried out by a switching circuit (not shown) included in the serial-parallel converter 250 according to the control of the main controller 210.

The data interface 260 may receive the "n" types of pre-processed data that have been selectively subjected to the serial-parallel conversion from the serial-parallel converter 250 and transmit them to the host 300 according to the control of the main controller 210. The data interface 260 may include a serial interface 262 and/or a parallel interface 264. The data interface 260 may transmit parallel data among the "n" types of pre-processed data through the parallel interface 264 to the host 300 and transmit serial data among the "n" types of pre-processed data through the serial interface 262 to the host 300. The data interface 260 may be implemented as a serial advanced technology attachment (SATA) interface, a universal serial bus (USB) interface, a PHY interface, or a PVI interface.

According to the current embodiments, the data processing unit 200 reconstructs data using the data requirement information DRI for the host 300, thereby increasing the compatibility with the host 300. In other words, the data processing unit 200 that is compatible with the host 300 can be implemented without changing the design of the data processing unit 200 according to the format and order of data and so on required by the host 300.

Figure 3:
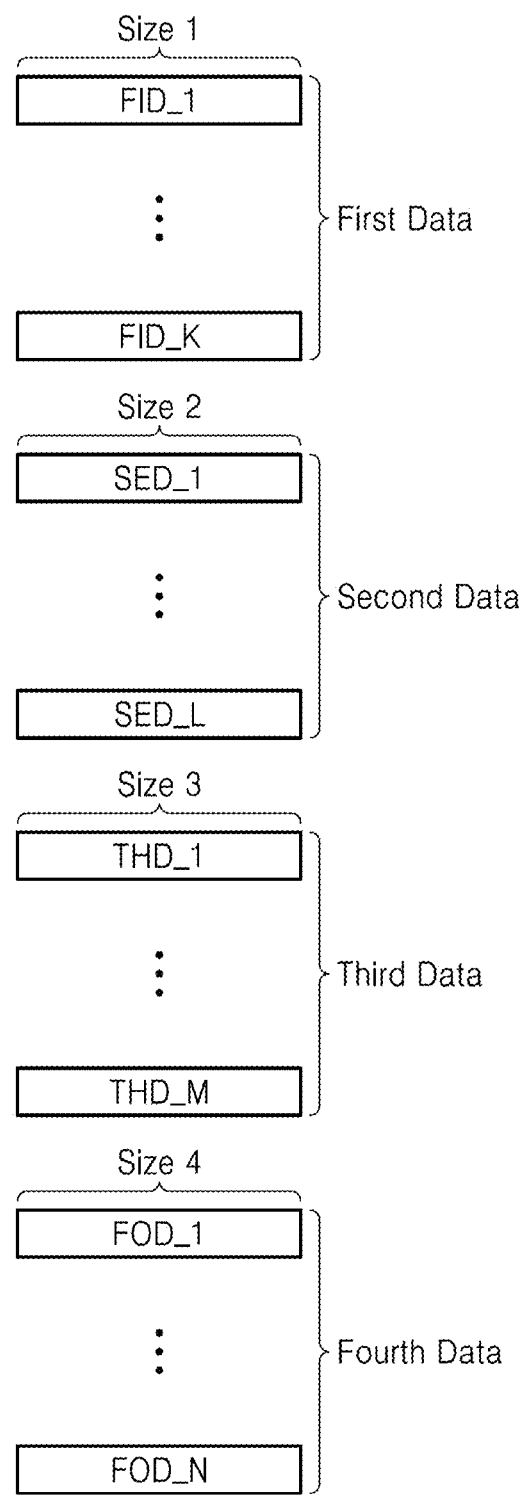
FIG. 3 is a diagram of pre-processed output from a pre-processing unit illustrated in FIG. 2 according to an embodiment of the inventive concepts.

FIG. 3 is a diagram of pre-processed output from the pre-processing unit 220 illustrated in FIG. 2 according to an embodiment of the inventive concepts. Referring to FIGS. 2 and 3, it is assumed that the pre-processing unit 220 outputs four types of pre-processed data, i.e., first data, second data, third data, and fourth data and that the first through fourth data are fully output over K, L, M and N times, respectively. Accordingly, the first data may consist of K sub data FID_1 through FID_K; the second data may consist of L sub data SED_1 through $SED_{13}$ L; the third data may consist of M sub data THD_1 through THD_M; and the fourth data may consist of N sub data FOD_1 through FOD_N.

The sub data of the respective first through fourth data may have sizes Size1 through Size4, respectively. It is assumed that all sub data of one of the first through fourth data have the same size. For example, while sizes Size1 through Size4 of the first through fourth data may be different with respect to each other, all sub data of the first data may have the same size, all sub data of the second data may have the same size, all sub data of the third data may have the same size and all sub data of the fourth data may have the same size. Each of the sub data may form a single packet. For instance, when the first data is image data, each of the K sub data FID_1 through FID_K may be a single frame in the image data.

The pre-processing unit 220 may determine the size of each of the first through fourth data according to size information, type information, an additional code including, for example, a CRC code, the amount of information depending on the type of data, a data transmission mode (including, for example, a serial, parallel, synchronous and/or a synchronous mode), requirements based on the processing information PI and so on.

Figure 4:
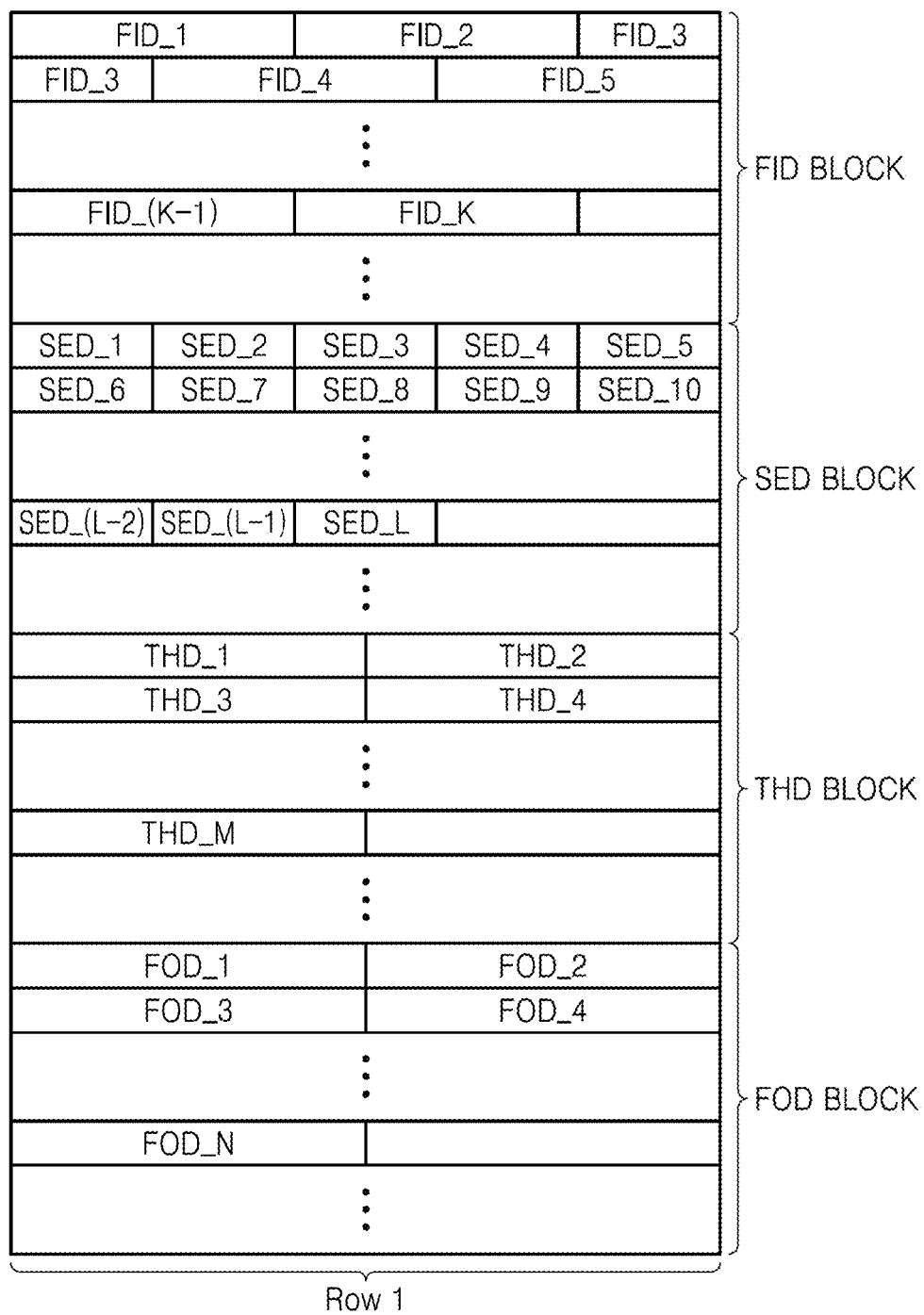
FIG. 4 is a block diagram of a pre-processing memory cell array included in a pre-processed data storing unit illustrated in FIG. 2 according to an embodiment of the inventive concepts.

FIG. 4 is a block diagram of a pre-processing memory cell array 245 included in the pre-processed data storing unit 240 illustrated in FIG. 2 according to an example embodiment of the inventive concepts. Referring to FIGS. 2 through 4, the pre-processing memory cell array 245 may be divided into a first data block FID BLOCK, a second data block SED BLOCK, a third data block THD BLOCK, and a fourth data block FOD BLOCK. It is assumed that a row Row1 of the pre-processing memory cell array 245 is 1000 bytes in length and that the sizes Size1 through Size4 of the respective sub data are respectively 400, 200, 500, and 500 bytes. The first data (FID_1-FID_K) through the fourth data (FOD_1-FOD_N) may be separately stored in the first through fourth data blocks FID BLOCK, SED BLOCK, THD BLOCK and FOD BLOCK, respectively.

The order in which the first data (FID_1-FID_K) through the fourth data (FOD_1-FOD_N) are transmitted from the pre-processing unit 220 to the pre-processed data storing unit 240 may be controlled by the main controller 210. The first data (FID_1-FID_K) through the fourth data (FOD_1-FOD_N) may be transmitted in units of lines including a plurality of types of data or in units of packets including one type of data.

Although the first data ($FID\_1$-$FID_{13}$ K) through the fourth data (FOD_1-FOD_N) are separately stored in the different blocks FID BLOCK, SED BLOCK, THD BLOCK, and FOD BLOCK in the embodiments illustrated in FIG. 4, the pre-processing memory cell array 245 may not be divided into blocks.

Figure 5:
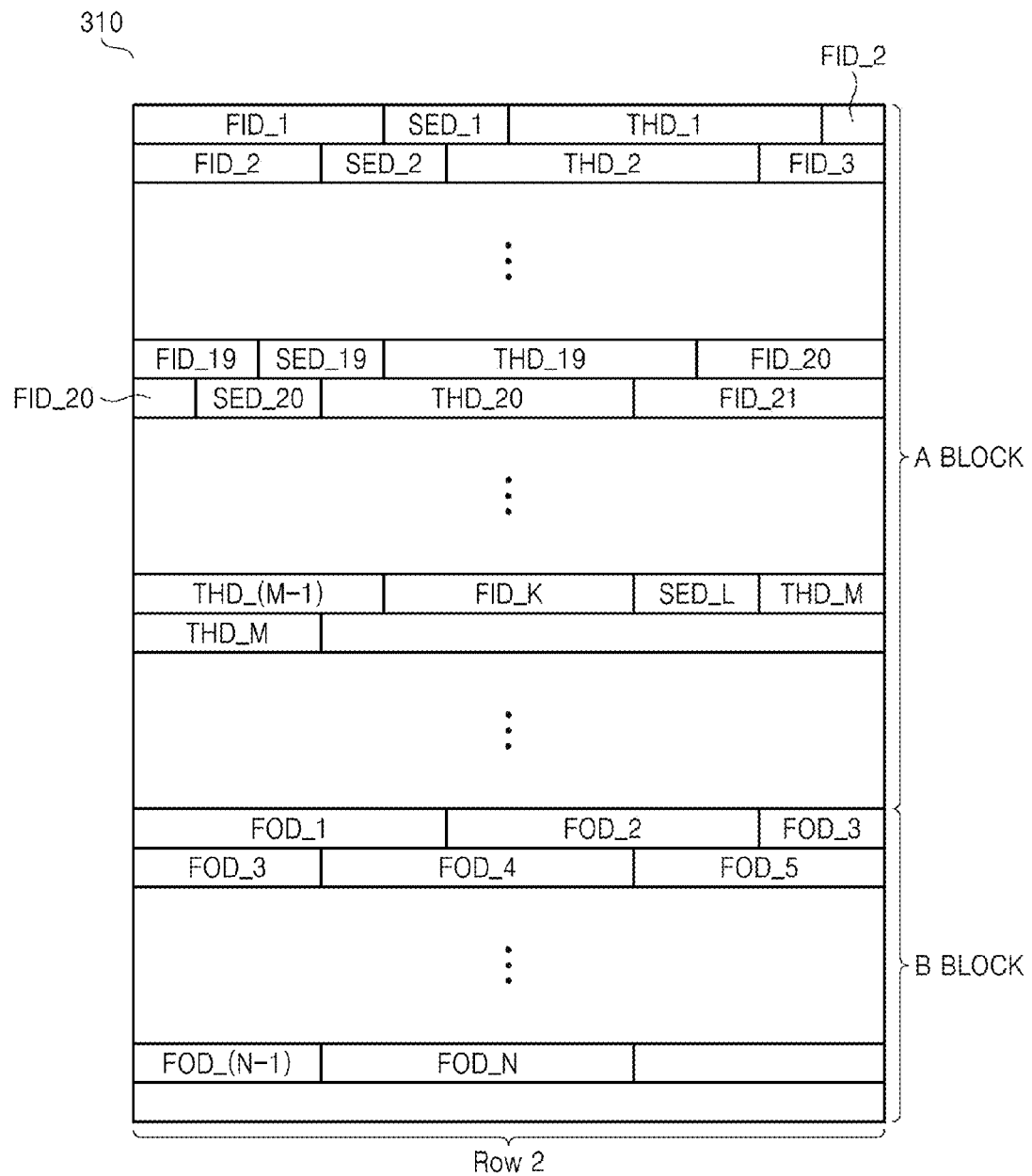
FIG. 5 is a block diagram of a host memory cell array included in a host illustrated in FIG. 2.

FIG. 5 is a block diagram of a host memory cell array 310 included in the host 300 illustrated in FIG. 2. Referring to FIGS. 2 through 5, the host 300 may include a non-volatile memory that can store four types of data transmitted from the data processing unit 200. FIG. 5 shows the host memory cell array 310 included in the volatile memory. It is assumed that a row Row2 of the host memory cell array 310 is 1,200 bytes in length.

The fourth data among the four types of data is assumed to be pointer data. In other words, the data requirement information DRI generated by the host 300 requires pointer data from the data processing unit 200. The pre-processed data storing unit 240 may transmit the first through fourth data to the serial-parallel converter 250 in units of packets, i.e., in units of sub data.

The pre-processed data storing unit 240 may determine the order in which the sub data of each of the first through fourth data are transmitted according to the processing information PI. For instance, in an image sensor outputting 30 frames per second, one capture data may be transmitted to the host 300 after 29 image data are transmitted to the host 300. For the sake of convenience, in the description it is assumed that the numbers of sub data in the respective first through fourth data are the same, i.e., K=L=M=N in the embodiments illustrated in FIG. 5. However, example embodiments of the inventive concepts are not limited to this arrangement, and according to an example embodiment of the inventive concepts, K, L, M and/or N may be different from one another. In addition, it is assumed that the pre-processed data storing unit 240 outputs the first through fourth data sequentially. However, example embodiments of the inventive concepts are not limited to this arrangement, and according to an example embodiment of the inventive concepts, the pre-processed data storing unit 240 may output the first through fourth data in parallel.

The host 300 may receive the first through fourth data through a host interface (not shown) from the data processing unit 200. The host 300 may divide the host memory cell array 310 into two blocks, i.e., A and B blocks and store the first through third data in the A block and the fourth data in the B block. In other embodiments, the host 300 may not divide the host memory cell array 310 into the A and B blocks, but an area corresponding to the B block may be implemented by a separate non-volatile memory.

The sub data of the respective first through third data may be alternately stored in the A block. The sub data of the fourth data may be sequentially stored in the B block. When the host 300 reads the twenty-fifth sub data in the first data and the fourth data which is pointer data does not exist, the host 300 needs to search and analyze the first through twenty-fourth sub data of each of the first through third data by bytes to find the twenty-fifth sub data in the first data.

The fourth data which is the pointer data is information about an absolute or relative memory address of data based on the data requirement information DRI including the type, order and size of the data required by the host 300 and may be revised when the pre-processing unit 220 modifies the data. Accordingly, when the host 300 reads the twenty-fifth sub data in the first data by referring to the fourth data, the host 300 can quickly obtain the position of the twenty-fifth sub data in the host memory cell array 310 from absolute or relative address information regarding the first data in the fourth data.

In other words, since the fourth data which is the pointer data includes information about the order, size and type of pre-processed data transmitted to the host 300, the position of the twenty-fifth sub data in the first data can be immediately obtained by adding 26,400 bytes to an address to which the first data is first received taking an account of the order of sub data of the respective first through third data (i.e., first data—second data—third data) and the sizes of the sub data (i.e., 400 bytes, 200 bytes, and 500 bytes).

Like in the case of providing the pointer data described with reference to FIG. 5, the data processing unit 200 generates the processing information PI according to the data requirement information DRI received from the host 300 and modifies one or more of the type, order, format and size of data to be transmitted to the host 300 to meet the requirements of the host 300, thereby increasing the compatibility with the host 300. In addition, the host 300 receives and uses the modified data and can thus perform data processing quickly and efficiently.

Figure 6:
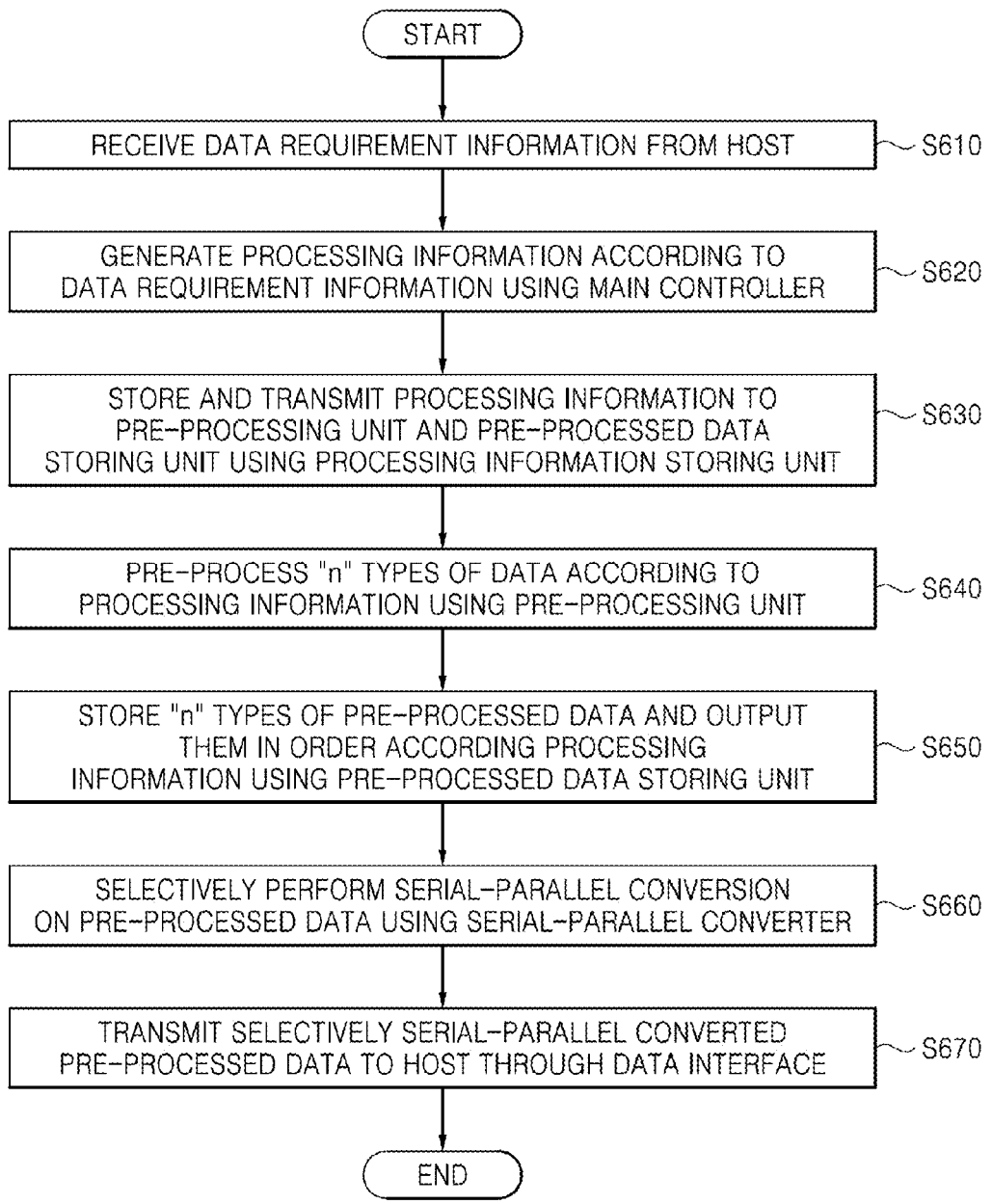
FIG. 6 is a flowchart of the operations of the data processing unit illustrated in FIG. 2 according to an embodiment of the inventive concepts.

FIG. 6 is a flowchart of the operations of the data processing unit 200 illustrated in FIG. 2 according to an embodiment of the inventive concepts. Referring to FIGS. 1 through 6, the host 300 generates the data requirement information DRI in order to quickly and efficiently process and provide data for a user and the main controller 210 of the data processing unit 200 receives the data requirement information DRI in operation S610. The data requirement information DRI may include diverse information, including, for example, one or more of the type, format, order, size, timing, address and transmission mode (serial/parallel mode and synchronous/asynchronous mode) of data, required by the host 300.

The main controller 210 generates the processing information PI according to the data requirement information DRI or its judgment and transmits the processing information PI to the processing information storing unit 230 in operation S620. The processing information PI may include, for example, one or more of the type, format, order, size, timing, address and transmission mode (serial/parallel mode and synchronous/asynchronous mode) of packet data.

The processing information storing unit 230 stores the processing information PI received from the main controller 210 and transmits the processing information PI to the pre-processing unit 220 and the pre-processed data storing unit 240 in operation S630. The pre-processing unit 220 receives "n" types of data from the main controller 210, pre-processes the "n" types of data, and transmits the "n" types of pre-processed data to the pre-processed data storing unit 240 in operation S640. The pre-processing unit 220 may include a plurality of registers (not shown) that can store "n" types of data.

For instance, the pre-processing unit 220 may determine the size and format of each of the "n" types of data based on the processing information PI received from the processing information storing unit 230 and perform pre-processing on the "n" types of data. The pre-processing unit 220 may transmit the "n" types of pre-processed data to the pre-processed data storing unit 240. The pre-processing may be a process of changing the size and format of each of the "n" types of data or a process of adding size information, type information, and/or a CRC code to each type of data.

The pre-processed data storing unit 240 may be divided into "n" blocks and may store "n" types of pre-processed data transmitted in units of lines or packets of the "n" blocks by types. The pre-processed data storing unit 240 receives the processing information PI from the processing information storing unit 230 and outputs the "n" types of pre-processed data in units of packets in output order determined by information about the order of data required by the host 300 in the processing information PI in operation S650.

The serial-parallel converter 250 receives the "n" types of pre-processed data in units of packets and selectively converts serial data into parallel data according to the control of the main controller 210 in operation S660. In other words, some data corresponding to serial transmission according to data transmission mode information included in the processing information PI among the "n" types of data may be transmitted to the data interface 260 without being converted into parallel data. The remaining data corresponding to parallel transmission according to the data transmission mode information included in the processing information PI among the "n" types of data may be converted into parallel data by the serial-parallel converter 250 before being transmitted to the data interface 260.

The data interface 260 receives the "n" types of pre-processed data that have been selectively subjected to the serial-parallel conversion from the serial-parallel converter 250 and transmits them to the host 300 according to the control of the main controller 210 in operation S670. The data interface 260 may include the serial interface 262 and/or the parallel interface 264. The data interface 260 may transmit parallel data among the "n" types of pre-processed data through the parallel interface 264 to the host 300 and transmit serial data among the "n" types of pre-processed data through the serial interface 262 to the host 300.

Figure 7:
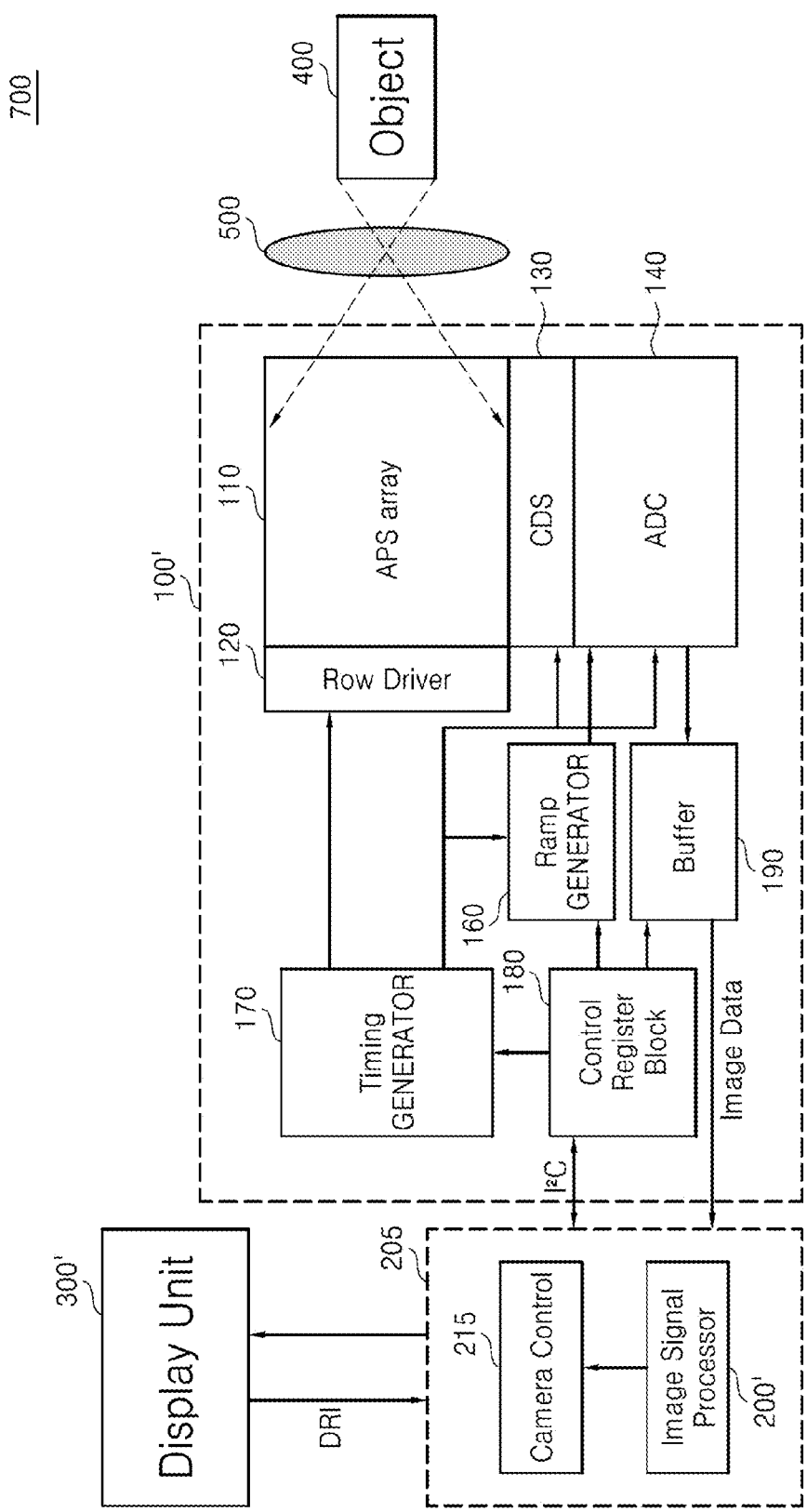
FIG. 7 is a block diagram of an image processing system including the data processing unit illustrated in FIG. 2 according to an embodiment of the inventive concepts.

FIG. 7 is a block diagram of an image processing system 700 including the data processing unit 200 illustrated in FIG. 2 according to an embodiment of the inventive concepts. Referring to FIG. 7, the image processing system 700 includes an image sensor 100', an image processor (e.g., a digital signal processor (DSP)) 205, and a display unit 300'.

The image sensor 100' includes a pixel array or an active pixel sensor (APS) array 110, a row driver 120, a correlated double sampling (CDS) block 130, an analog-to-digital converter (ADC) 140, a ramp generator 160, a timing generator 170, a control register block 180, and a buffer 190.

The image sensor 100' may be controlled by the image processor 205 to sense an object 400 picked up through a lens 500 and output image data. The image sensor 100' may correspond to the data generator 100 illustrated in FIG. 2. The image processor 205 may output an image, which has been sensed and output by the image sensor 100', to the display unit 300'.

The pixel array 110 includes a plurality of photo sensitive devices including, for example, photo diodes or pinned photo diodes. The pixel array 110 senses light using the photo sensitive devices and converts the light into an electrical signal to generate an image signal.

The timing generator 170 may output a control signal to the row driver 120, the ADC 140, and the ramp generator 160 to control the operations of the row driver 120, the ADC 140, and the ramp generator 160. The control register block 180 may output a control signal to the ramp generator 160, the timing generator 170, and the buffer 190 to control the operations of the elements 160, 170, and 190. The control register block 180 is controlled by a camera control 215.

The row driver 120 drives the pixel array 110 in units of rows. For instance, the row driver 120 may generate a row selection signal. The pixel array 110 outputs to the CDS block 130 a reset signal and an image signal from a row selected by the row selection signal received from the row driver 120. The CDS block 130 may perform CDS on the reset signal and the image signal.

The ADC 140 compares a ramp signal output from the ramp generator 160 with a CDS signal output from the CDS block 130, generates a result signal, counts the result signal, and outputs a count value to the buffer 190.

The buffer 190 temporarily stores a digital signal output from the ADC 140 and senses and amplifies the digital signal before outputting it. The buffer 190 may include a plurality of column memory blocks, e.g., SRAMs, provided for respective columns for temporal storing; and a sense amplifier sensing and amplifying the digital signal received from the ADC 140.

The image processor 205 includes the camera control 215 and an image signal processor 220'. The camera control 215 controls the control register block 180. The camera control 215 may control the image sensor 100', and more specifically, the control register block 180 using an inter-integrated circuit ($I^2C$), but example embodiments of the inventive concepts are not restricted thereto.

The image signal processor 200' receives image data, i.e., an output signal of the buffer 190; processes the image data into an image nice for people to look at; and outputs the image to the display unit 300'. Here, the image signal processor 200' may correspond to the data processing unit 200 illustrated in FIG. 2. The image signal processor 200' may receive the data requirement information DRI from the display unit 300' and process the image data into a form required by the display unit 300' before outputting the image data.

Although the image signal processor 200' is included in the image processor 205 in the embodiments illustrated in FIG. 7, this design may be changed by those skilled in the art. For instance, the image signal processor 200' may be placed within the image sensor 100'. The display unit 300' may be any device that can output an image and may receive and output the processed image data from the image signal processor 200'. The display unit 300' may correspond to the host 300 illustrated in FIG. 2, and the image sensor 100' may correspond to the data generator 100 illustrated in FIG. 2.

Figure 8:
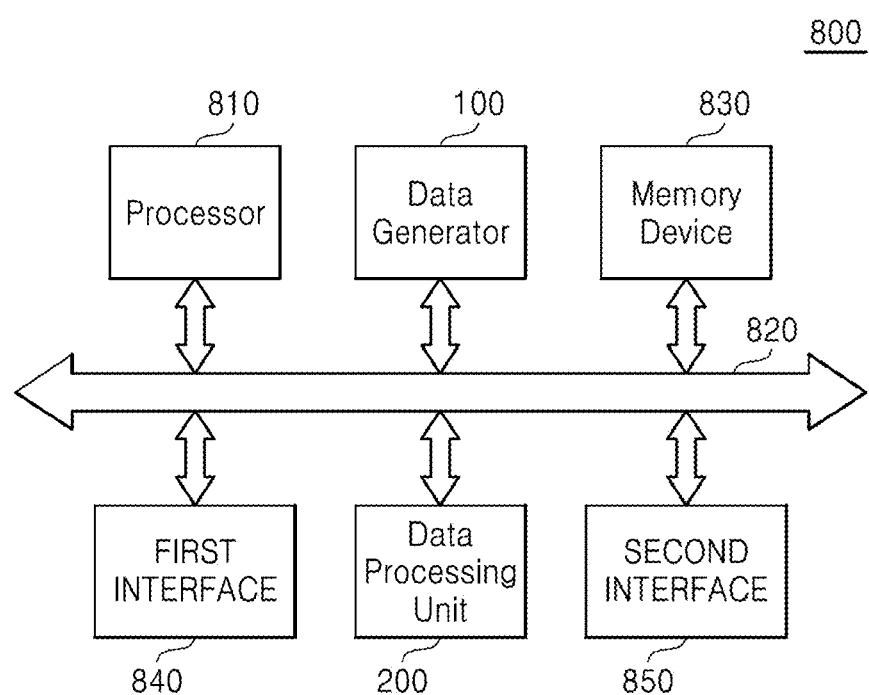
FIG. 8 is a block diagram of a computer system including the data processing unit illustrated in FIG. 2 according to an embodiment of the inventive concepts.

FIG. 8 is a block diagram of a computer system 800 including the data processing unit 200 illustrated in FIG. 2 according to an embodiment of the inventive concepts. Referring to FIGS. 1 through 8, the computer system 800 includes a processor 810, a memory device 830, a first interface 840, a second interface 850, the data generator 100, and the data processing unit 200, which are connected to a system bus 820.

The processor 810 controls the overall operation of the computer system 800. The processor 810 communicates with the data processing unit 200 to control the operation of the data processing unit 200.

The processor 810 may control the data write or read operation of the memory device 830. The memory device 830 may store pre-processed data that has been processed by the data processing unit 200.

The first interface 840 may be implemented as an input/output (I/O) interface. In this case, the processor 810 may control data to be read from the memory device 830 and transmitted to an external device through the first interface 840 or may control data received from an external device through the first interface 840 to be stored in the memory device 830.

For instance, the first interface 840 may be a display controller that controls the operation of a display. At this time, the display controller may transmit data processed by the data processing unit 200 to the display according to the control of the processor 810. The second interface 850 may be implemented as a wireless interface. In this case, the processor 810 may control data to be read from the memory device 830 and transmitted via a wireless connection to an external device through the first interface 840 or may control data received via the wireless connection from an external device through the first interface 840 to be stored in the memory device 830.

As described above, the data processing unit 200 may process "n" types of data output from the data generator 100 and transmit the data to the processor 810 or the memory device 830. The computer system 800 may be implemented as a portable application including the data processing unit 200. The portable application may be a portable computer, a digital camera, a cellular phone, a smart phone, or a tablet PC.

Figure 9:
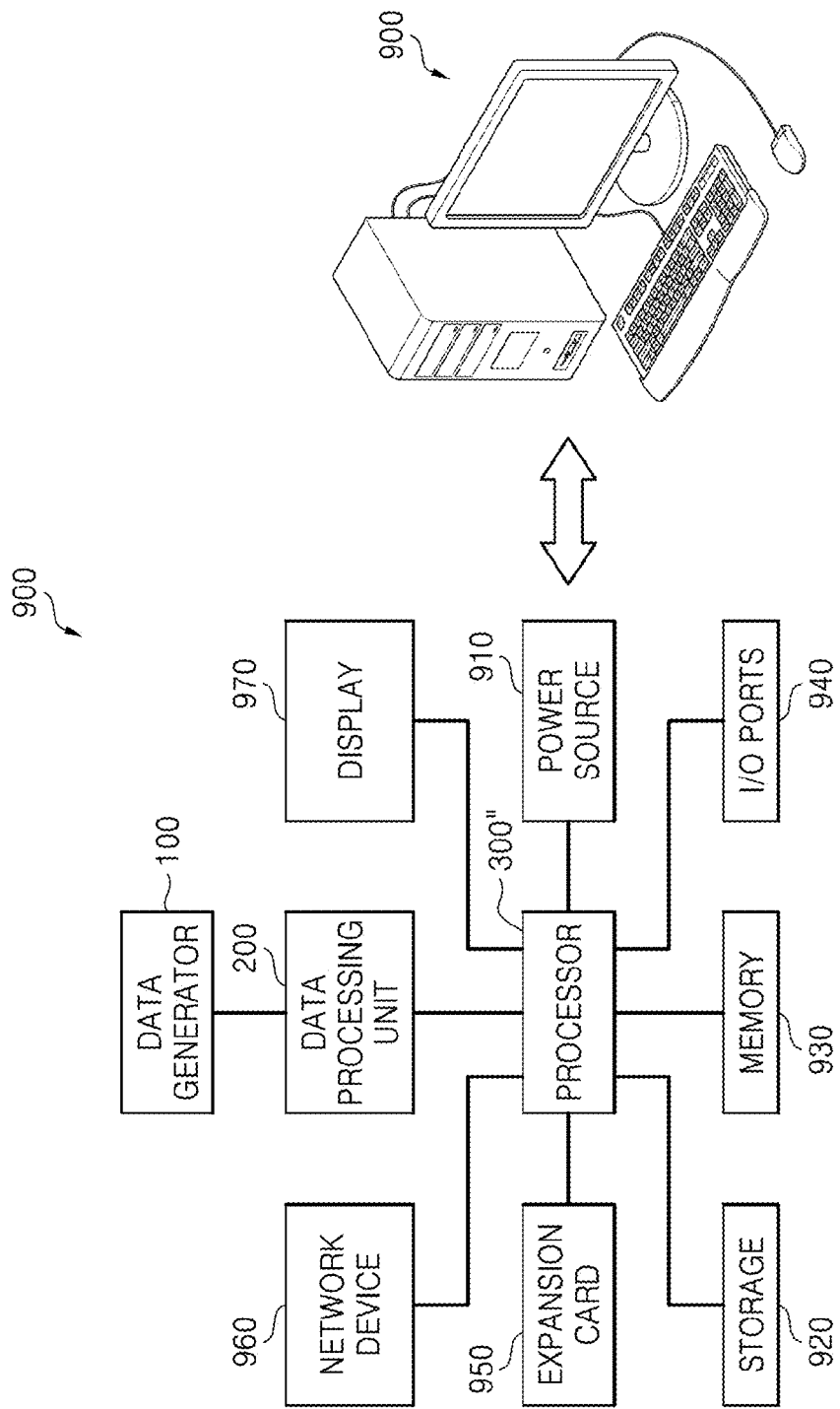
FIG. 9 is a block diagram of a data processing system including the data processing unit illustrated in FIG. 2 according to an embodiment of the inventive concepts.

FIG. 9 is a block diagram of a data processing system 900 including the data processing unit 200 illustrated in FIG. 2 according to an embodiment of the inventive concepts. Referring to FIG. 9, the data processing system 900 may be implemented as a PC or a data server.

The data processing system 900 includes a processor 300", a power source 910, a storage 920, a memory 930, I/O ports 940, an expansion card 950, a network device 960, a display 970, the data generator 100, and the data processing unit 200.

The processor 300" may be implemented by an integrated circuit (IC) or a system-on-chip (SoC) and the processor 300" corresponds to the host 300 illustrated in FIG. 2. The processor 300" may be, for example, a multi-core processor.

The processor 300" may control the operation of at least one of the elements 100, 200, and 910 through 970. The power source 910 may supply an operating voltage to at least one of the elements 100, 200, and 920 through 970. The storage 920 may be implemented by a hard disk drive (HDD) or a solid state drive (SSD).

The memory 930 may be implemented by a volatile or non-volatile memory. A memory controller (not shown) that controls a data access operation, e.g., a read operation, a write operation (or a program operation), or an erase operation, on the memory 930 may be integrated into or embedded in the processor 300". Alternatively, the memory controller may be provided between the processor 300" and the memory 930.

The I/O ports 940 are ports that receive data transmitted to the data processing system 900 or transmit data from the data processing system 900 to an external device. For instance, the I/O ports 940 may include a port connecting with a pointing device including, for example, a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the data processing system 900 to be connected with a wired or wireless network. The display 970 displays data output from the storage 920, the memory 930, the I/O ports 940, the expansion card 950, or the network device 960.

The data generator 100 generates data required by a user as shown in FIG. 2. The data generator 100 may be implemented as a microphone generating audio data or an image sensor generating image data. The processor 300" may correspond to the host 300 illustrated in FIG. 2. Accordingly, the data processing unit 200 processes the data generated by the data generator 100 into a form required by the processor 300" and then transmits the processed data to the processor 300".

Figure 10:
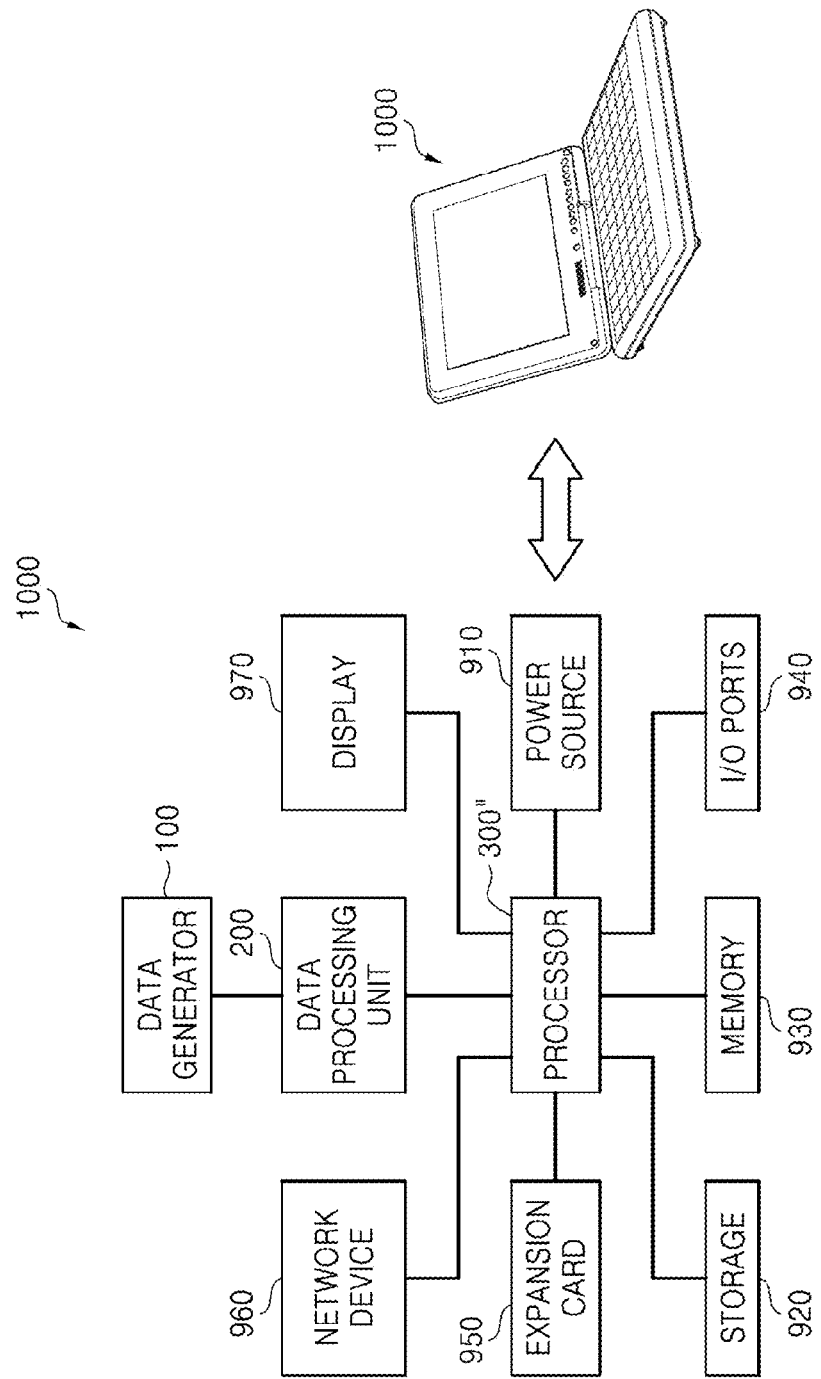
FIG. 10 is a block diagram of a computer system including the data processing unit illustrated in FIG. 2 according to an embodiment of the inventive concepts.

FIG. 10 is a block diagram of a computer system including the data processing unit illustrated in FIG. 2 according to an example embodiment of the inventive concepts. Referring to FIG. 10, the data processing system 1000 may be implemented as a laptop computer.

Figure 11:
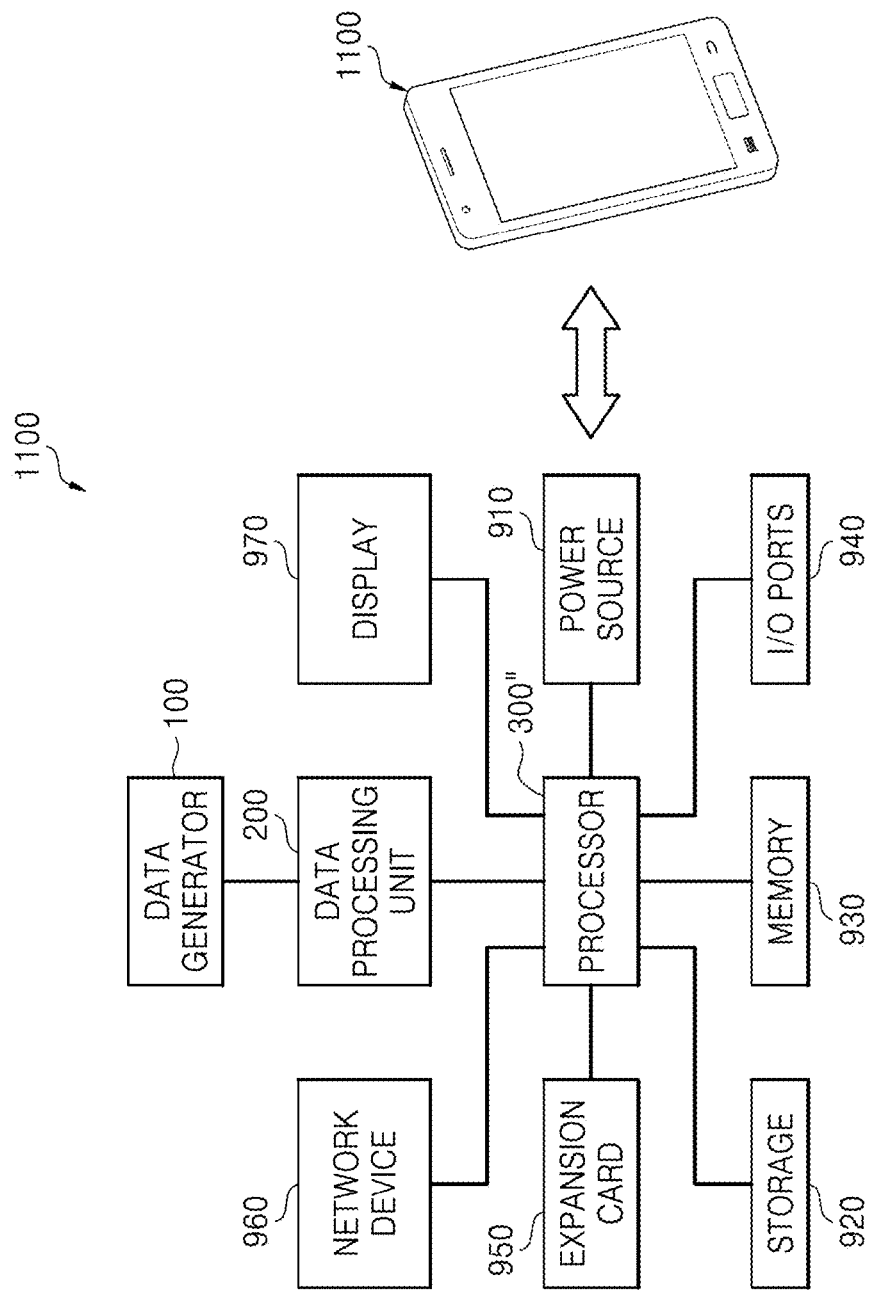
FIG. 11 is a block diagram of a data processing system including the data processing unit illustrated in FIG. 2 according to an embodiment of the inventive concepts.

FIG. 11 is a block diagram of a data processing system including the data processing unit illustrated in FIG. 2 according to an example embodiment of the inventive concepts. Referring to FIG. 11, the data processing system 1100 may be implemented as a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PND),a handheld game console, or an e(electronic)-book device.

An example embodiment of the inventive concepts can also be embodied as computer-readable codes on a computer-readable medium. The computer-readable recording medium may be non-transitory and may be, for example, any data storage device that can store data as a program which can be thereafter read by a computer system. Examples of the computer-readable recording medium include read-only memory (ROM), random-access memory (RAM). CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to implement an example embodiment of the inventive concepts can be easily construed by programmers.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A data processing unit comprising:
a main controller configured to receive data requirement information from a host and to generate processing information based on the data requirement information;
a pre-processing unit configured to pre-process n types of data output from the main controller according to the processing information and to generate n types of pre-processed data where n is an integer equal to or greater than 2; and
a pre-processed data storing unit configured to store the n types of pre-processed data and to output the n types of pre-processed data in an output order determined based on the processing information,
wherein the processing information includes information about at least one of type, format, order, size and transmission mode of the n types of pre-processed data.

2. The data processing unit of claim 1, wherein
the main controller is configured to receive data from a data generator and generate the n types of data, and
the n types of data include pointer data corresponding to information about an absolute or relative memory address of each of remaining ones of the n types of data.

3. The data processing unit of claim 1, further comprising:
a processing information storing unit configured to receive the processing information from the main controller and to transmit the processing information to the pre-processing unit and the pre-processed data storing unit.

4. The data processing unit of claim 1, further comprising:
a serial-parallel converter configured to receive the n types of pre-processed data and to selectively perform serial-parallel conversion on the n types of pre-processed data according to control of the main controller; and
a data interface configured to transmit the selectively serial-parallel converted n types of pre-processed data to the host according to the control of the main controller.

5. The data processing unit of claim 4, wherein the data interface comprises:
a serial interface and a parallel interface.

6. The data processing unit of claim 1, wherein the pre-processed data storing unit is configured to store the n types of pre-processed data in n blocks of a memory cell array such that, for each of the n types of pre-processed data, data of the type of pre-processed data is stored in a block, from among the n blocks, that corresponds to the type.

7. The data processing unit of claim 1, wherein the pre-processed data storing unit is configured to output the n types of pre-processed data in units of packets.

8. A data processing system comprising:
a host;
a data generator configured to generate data in an analog or digital form; and
the data processing unit of claim 1,
wherein the host generates the data requirement information that determines at least one of a type, order and size of the n types of data to be received.

9. A data processing method comprising:
receiving, at a main controller, data requirement information from a host;
generating processing information based on the data requirement information;
pre-processing, at a pre-processing unit, n types of data output from the main controller according to the processing information and generating n types of pre-processed data where n is an integer of at least 2;
storing, at a pre-processed data storing unit, the n types of pre-processed data; and
outputting the n types of pre-processed data in an output order determined based on the processing information,
wherein the processing information includes information about at least one of type, format, order, size and transmission mode of the n types of pre-processed data.

10. The data processing method of claim 9, wherein the receiving receives data from a data generator,
the generating generates the n types of data, and
the n types of data include pointer data corresponding to information about an absolute or relative memory address of each of remaining ones of the n types of data.

11. The data processing method of claim 9, further comprising:
receiving, at a processing information storing unit, the processing information from the main controller; and
transmitting the processing information from the processing information storing unit to the pre-processing unit and the pre-processed data storing unit.

12. The data processing method of claim 9, further comprising:
receiving, at a serial-parallel converter, the n types of pre-processed data;
selectively performing serial-parallel conversion on the n types of pre-processed data according to control of the main controller; and transmitting, from a data interface, the selectively serial-parallel converted n types of pre-processed data to the host according to the control of the main controller.

13. The data processing method of claim 12, wherein the transmitting selectively serial-parallel converted n types of pre-processed data to the host transmits the selectively serial-parallel converted n types of pre-processed data using a serial communication interface and a parallel communication interface.

14. The data processing method of claim 9, wherein the storing the n types of pre-processed data stores the n types of pre-processed data in n blocks of a memory cell array such that, for each of the n types of pre-processed data, data of the type of pre-processed data is stored in a block, from among the n blocks, that corresponds to the type.

15. The data processing method of claim 9, wherein the outputting the n types of pre-processed data outputs the n types of pre-processed data in units of packets.

16. A data processing unit comprising:
a main controller configured to generate processing information based on data requirement information received from a host, and configured to generate n types of output data, the processing information including information regarding at least one of a desired type, format, order, size and transmission mode corresponding to the n types of output data, n being an integer equal to or greater than 2; and
a pre-processing unit configured to pre-process the n types of output data according to the processing information and to generate n types of pre-processed data, the pre-processing including at least one of altering the n types of output data and adding information to the n types of output data, based on the processing information.

17. The data processing unit of claim 16, further comprising:
a pre-processed data storing unit configured to store the n types of pre-processed data and to output the n types of pre-processed data in an output order determined based on the processing information.

18. The data processing unit of claim 16, wherein
the main controller is configured to receive data from a data generator and generate the n types of data, and
the n types of data include pointer data corresponding to information about an absolute or relative memory address of each of remaining ones of the n types of data.

19. A data processing system comprising:
a host;
a data generator configured to generate data in an analog or digital form; and
the data processing unit of claim 16,
wherein the host generates the data requirement information, and the data requirement information determines at least one of the type, order and size of the n types of pre-processed data.

* * * * *